Jan. 13, 1931.  V. LANCIA  1,789,238

FRAME FOR MOTOR VEHICLES

Filed Dec. 13, 1928

Patented Jan. 13, 1931

1,789,238

UNITED STATES PATENT OFFICE

VINCENZO LANCIA, OF TURIN, ITALY

FRAME FOR MOTOR VEHICLES

Application filed December 13, 1928, Serial No. 325,787, and in Italy January 12, 1928.

The present invention relates to the frames of the motor-vehicles comprising side members and transverse members interconnecting said side members, and it has for its object a frame of the above stated construction, in which the frame comprises a hollow transverse member having a size enabling it to be used as a container say for fuel intended to operate the vehicle engine, the edges of said hollow body being connected in a direct and rigid manner with the side members of said frame.

In the motor-vehicle frame according to the present invention the said transverse hollow member has a comparatively large sectional area and is connected with the side members of the frame along the edge or contour of its cross section and therefore it has an efficient action to stiffen the whole of the frame and at the same time it provides for storing useful matters as the fuel supply, it providing a container which either may form a tank for fuel supply or may contain a tank in which said fuel is stored.

Figure 1:
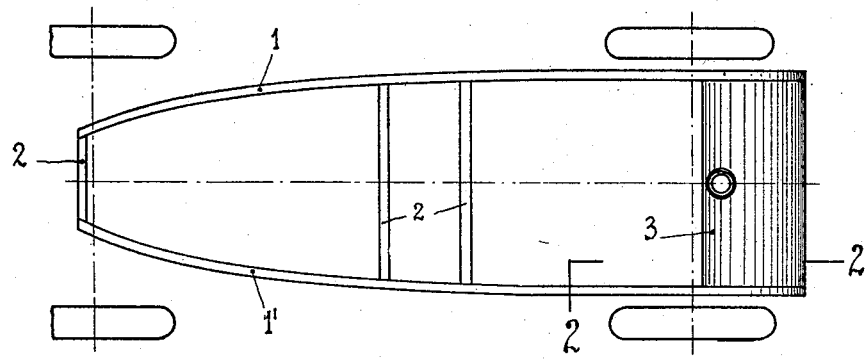
Figure 2:
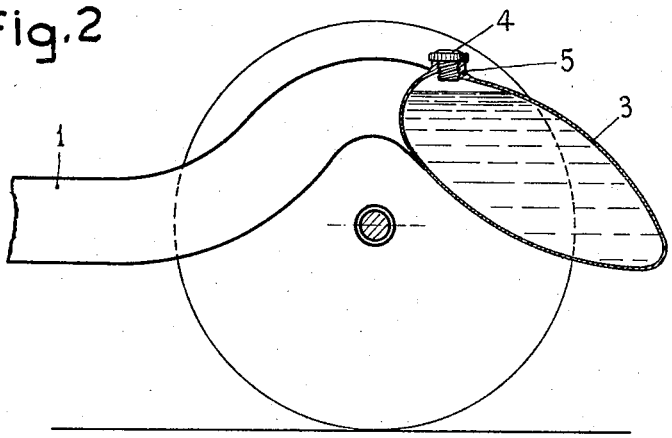

On the annexed drawing is illustrated by way of example an embodiment of this invention and Figure 1 is a diagrammatical plan view of a frame according to this invention;

Figure 2 is a fragmentary longitudinal vertical section to an enlarged scale of the rear portion of the vehicle frame on line 2—2 of Fig. 1.

In the construction illustrated said frame comprises two side members 1, 1' which are interconnected by transverse members 2, in any preferred or conventional manner.

Said side members or sills 1, 1' are further interconnected, conveniently near one end of the frame, by a hollow body 3 having its axis transverse to the axis of the frame and its ends fastened on the side members or sills 1—1'.

Said hollow member 3 has a comparatively large sectional area and it may have an elongated contour as illustrated to follow the contour of the portion of the side members 1—1' it is connected to, and impart a large resistance to the whole against bending stresses.

The hollow transverse member 3 is preferably located adjacent the rear end of the frame of the motor vehicle as illustrated, but it may be provided in any preferred location on said frame.

Owing to the large cross section of said transverse member, it secures a large resistance against stresses in all directions and therefore it efficiently counteracts displacements of the side members 1—1' with respect to each other.

Said hollow member 3 may be used to provide or enclose the reservoir or tank for the fuel supply and therefore it is closed at its ends by head plates or is fastened to unperforated portions of the side members 1—1' the interconnection being a fluid-tight one; said hollow body is further provided with an inlet port 5 having a sealing plug 4.

By the described construction the advantage is secured that the vehicle frame is made more rigid and further the weight may be reduced as the stiffening transverse member 3 acts also as a fuel tank and a separate tank may be omitted.

What I claim as my invention and desire to secure by United States Letters Patent is:—

A frame for a motor vehicle comprising side members and a hollow body forming a container and lying transverse to said side members at the rear end of said frame, said body having the edge of each of its ends connected throughout its whole extent with one of the side members of said frame.

In testimony whereof I have signed my name to this specification.

VINCENZO LANCIA.